United States Patent
Chen

(10) Patent No.: US 7,273,204 B2
(45) Date of Patent: Sep. 25, 2007

(54) MOLD FOR FORMING OPTICAL LENS AND METHOD FOR MANUFACTURING SUCH MOLD

(75) Inventor: Ga-Lane Chen, Guangdong (CN)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 7 days.

(21) Appl. No.: 11/308,128

(22) Filed: Mar. 8, 2006

(65) Prior Publication Data

US 2006/0261241 A1    Nov. 23, 2006

(30) Foreign Application Priority Data

May 20, 2005 (CN) .................. 2005 1 0034760

(51) Int. Cl.
*B29D 11/00* (2006.01)
*B28B 7/38* (2006.01)

(52) U.S. Cl. .................. 249/114.1; 425/470; 425/808; 106/38.28

(58) Field of Classification Search .......... 249/80, 249/114.1, 115, 134; 425/394, 470, 808; 264/337, 338; 106/38.22, 38.27, 38.28, 38.9
See application file for complete search history.

(56) References Cited

U.S. PATENT DOCUMENTS

| | | | | |
|---|---|---|---|---|
| 5,382,274 | A * | 1/1995 | Yamamoto et al. | 65/26 |
| 5,711,780 | A * | 1/1998 | Taniguchi | 65/286 |
| 5,855,641 | A * | 1/1999 | Taniguchi | 65/286 |
| 6,913,715 | B2 * | 7/2005 | Li et al. | 264/1.36 |
| 6,986,857 | B2 | 1/2006 | Klemm et al. | |
| 2003/0164562 | A1 * | 9/2003 | Li et al. | 264/1.32 |
| 2005/0226955 | A1 * | 10/2005 | Yuasa et al. | 425/406 |
| 2006/0097416 | A1 * | 5/2006 | Chen | 264/2.5 |

* cited by examiner

*Primary Examiner*—Yogendra N. Gupta
*Assistant Examiner*—Dimple Bodawala
(74) *Attorney, Agent, or Firm*—Winston Hsu

(57) ABSTRACT

A mold 50 for forming optical lenses has a molding portion 10 having a molding surface 12, a thin film 30 is formed on the molding surface, which is made from $SiCH_xN_y$, wherein x is in the range of 0.02~0.10, y is in the range of 0.05~0.30. A method for manufacturing the mold is also provided.

9 Claims, 2 Drawing Sheets

MOLD FOR FORMING OPTICAL LENS AND METHOD FOR MANUFACTURING SUCH MOLD

FIELD OF THE INVENTION

The present invention relates to molds for forming optical lenses and method for manufacturing the molds, and more particularly to a mold having a long lifetime and a method for making the same.

DESCRIPTION OF RELATED ART

Optical lenses are critical components in many optical systems. They are used in many fields, such as digital cameras, optical apparatus, et al. It is known to all that surface optical quality of optical lenses is an important factor which can influence a quality of optical lenses.

In actual industrial production, most optical lenses are manufactured by molds. As to the molds, the most nuclear portion is molding surface, which is used to form optical lenses directly. Accordingly, the quality of the molding surface can directly influence the surface optical quality of optical lenses.

During molding process, a mold is usually used for thousands of times. That is to say, it has high usage frequency. Because the mold needs to be closed and opened for thousands of times, the molding surface contacts with molding products for thousands of times, accordingly. Thus, it will be damaged easily. When damaged, it must be changed in time, otherwise it will influence the quality of formed optical lenses. Since molds cost much, changing molds frequently will improve the cost.

Therefore, a heretofore-unaddressed need exists in the industry to address the aforementioned deficiencies and inadequacies associated with molds and method for manufacturing the molds.

SUMMARY OF INVENTION

In a preferred embodiment, a mold for forming optical lenses has a molding portion with a molding surface. A thin film is formed on the molding surface. The thin film is comprised of SiCHxNy, wherein x is in a range of 0.02~0.1, y is in a range of 0.05~0.3.

A method for manufacturing the mold includes the following steps: connecting a SiC target and a mold preform having a molding surface to two respective electrodes, and placing the SiC target and the mold preform in a hermetic chamber, with the molding surface facing the SiC target; evacuating the hermetic chamber to create a vacuum in the hermetic chamber; introducing a sputtering gas and reactive gases into the hermetic chamber, the reactive gases being a combination of a hydrogen gas or hydrocarbon gas, and a nitrogen gas; and applying a high frequency voltage between the electrodes at a frequency of about 13.56 MHz, thereby obtaining a mold having a SiCHxNy thin film on the molding surface, wherein x is in a range of 0.02~0.1, y is in a range of 0.05~0.3.

Compared with those available in the conventional art, sputtering rate of the present sputtering process is higher, and thin film formed therefrom has more compact structure and stronger adhesive force to the molding portion. Thus, the method for manufacturing above SiCHxNy film has high efficiency, and thin film formed therefrom can adhere tightly to the molding portion of the mold.

BRIEF DESCRIPTION OF DRAWINGS

Many aspects of the present mold and related methods can be better understood with reference to the following drawings. The components in the drawings are not necessarily to scale, emphasis instead being placed upon clearly illustrating the principles of the present light guide plates and the related backlight modules. Moreover, in the drawings, like reference numerals designate corresponding parts throughout the several views.

DETAILED DESCRIPTION

Figure 1:
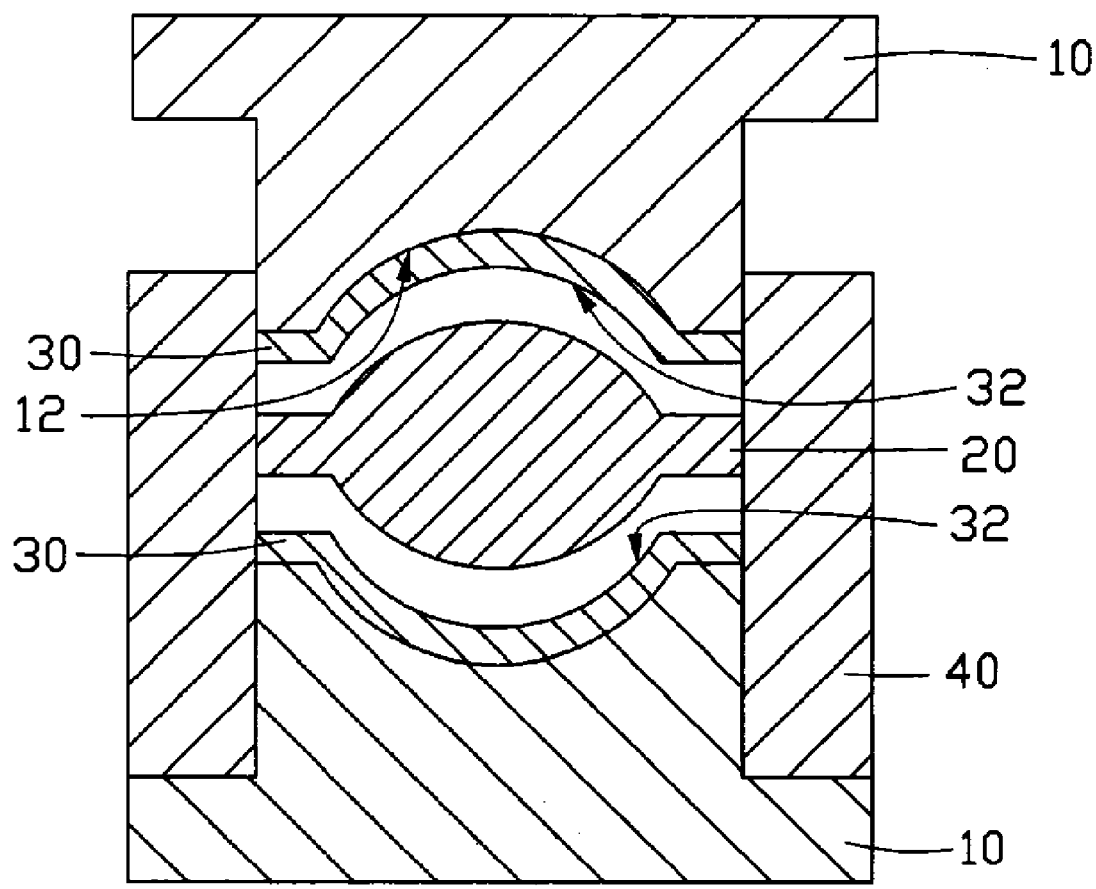
FIG. 1 is a cross-sectional view of a mold having a thin film formed on a molding surface thereof for forming optical lenses of a preferred embodiment.

Referring to FIG. 1, a mold 50 for forming an optical lens 20 in accordance with a preferred embodiment includes a molding portion 10 and a guiding portion 40. The molding portion 10 is used for molding optical lenses, and the guiding portion 40 is used for guiding the mold to operate between an open position and a closed position. The molding portion 10 includes a core insert and a cavity insert each having a smooth molding surface 12 with a surface roughness (Ra) of less than 10 nanometers. The molding surface 12 is a nuclear portion of the molding portion 10, which comes into contact with molded products. To prolong lifetime of the mold 50, protect the molding surface 12, save cost of manufacture and improve qualities of optical lenses formed, a thin film 30 is formed on the molding surface 12. In the preferred embodiment, the thin film 30 forms a film surface 32 to be configured to contact with the optical lens 20 directly. The film surface 32 has a reverse shape to that of the optical lens 20 to be formed.

The molding portion 10 is made from tungsten carbide (WC), while the optical lenses 20 are made from glass or silicon oxide ($SiO_2$). Thus the material of the thin film 30 is required to have good adhesion to WC as well as good separability from glass or silicon oxide. In the preferred embodiment the thin film 30 is made from $SiCH_xN_y$, wherein x is in the range of 0.02~0.10, preferred 0.03~0.05; and y is in the range of 0.05~0.30, preferred 0.08~0.15. The thin film 30 has a thickness in the range from 100 to 1000 nanometers, preferably in the range from 200 to 500 nanometers.

Generally, a molding temperature of optical lenses 20 is in the range from 500 to 600 centigrade. When the temperature is above 500 centigrade, that is, during molding, the coefficient of thermal expansion of $SiO_2$ is $19.35 \times 10^{-6} \sim 27.8 \times 10^{-6}$, while that of $SiCH_xN_y$ is in the range of $4.63 \times 10^{-6} \sim 5.12 \times 10^{-6}$. It is very clear that the coefficient of thermal expansion of $SiO_2$ is very different from that of $SiCH_xN_y$. Therefore the thin film 30 can be easily separated from the optical lens 20. At the same time, the coefficient of thermal expansion of WC is in the range of $4.42 \times 10^{-6} \sim 4.92 \times 10^{-6}$ which is close to that of $SiCH_xH_y$. Thus, the thin film 30 has good adhesion to the molding portion 10 made from WC. In addition, the $SiCH_xN_y$ is also a rigidity insulating material, having a high rigidity, which can prolong the lifetime of the mold 50. The coefficient of thermal expansion of $SiCH_xN_y$, WC and $SiO_2$ at different ranges of temperature are listed below:

| Temperature | Material | | |
| --- | --- | --- | --- |
| | $SiCH_xN_y$ | WC | $SiO_2$ |
| 25~500° C. | $4.63 \times 10^{-6}$ | $4.42 \times 10^{-6}$ | $19.35 \times 10^{-6}$ |
| 25~515° C. | — | — | $22.2 \times 10^{-6}$ |
| 25~575° C. | — | — | $27.8 \times 10^{-6}$ |
| 25~1000° C. | $5.12 \times 10^{-6}$ | $4.84 \times 10^{-6}$~$4.92 \times 10^{-6}$ | $14.58 \times 10^{-6}$ |

Since $SiCH_xN_y$ is an insulating material, it cannot be manufactured easily. In the preferred embodiment, a radio frequency reactive sputtering process has been provided to deposit the thin film 30 on the molding surface 12.

Figure 2:
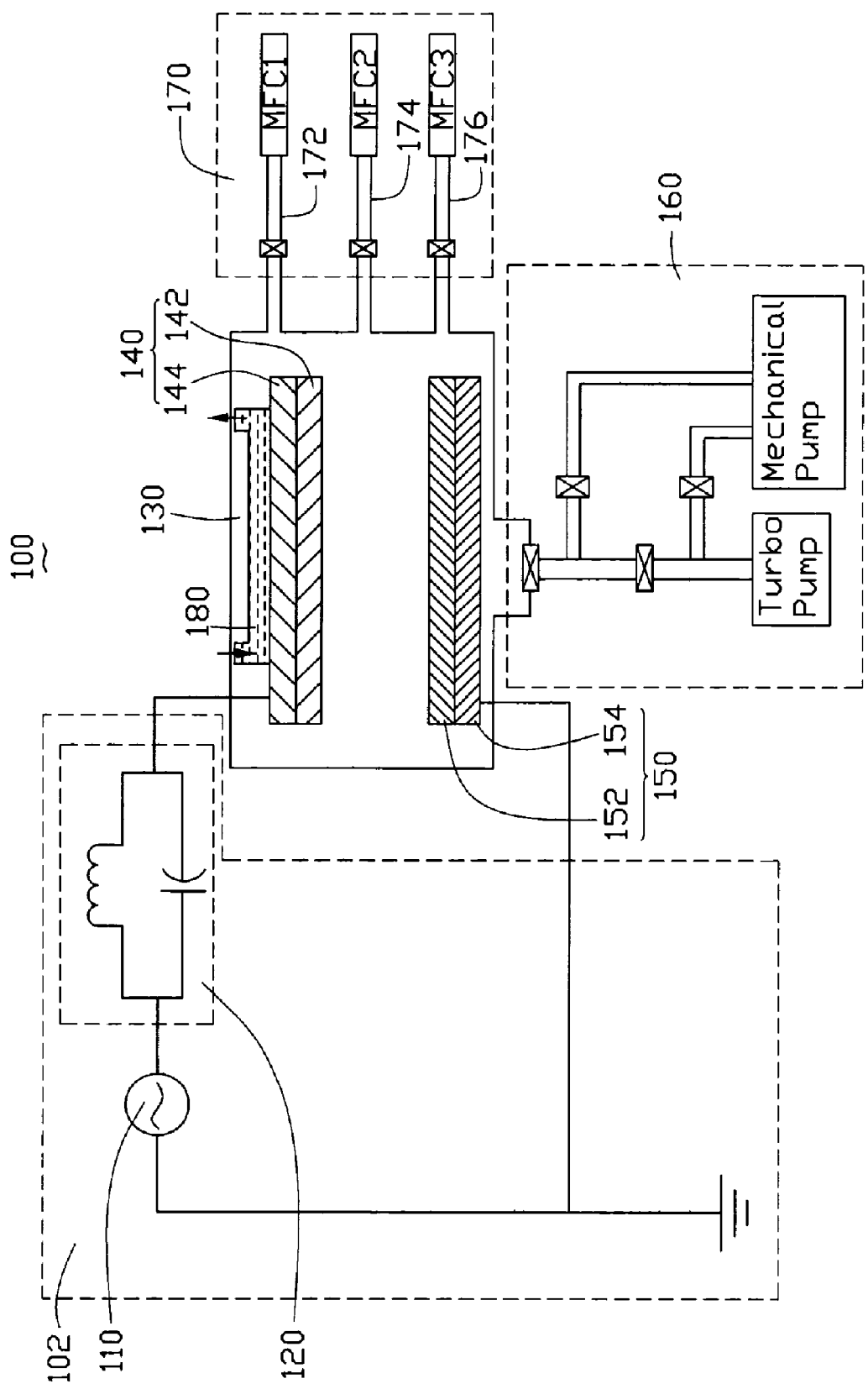
FIG. 2 is a schematic view of an apparatus for forming the thin film on the molding surface of the mold of FIG. 1.

Referring to FIG. 2, a sputtering apparatus 100 is disclosed, which includes a high frequency electric field region 102 and a hermetic chamber 130. In the high frequency electric field region 102, a high frequency power supply 110 is arranged. In the hermetic chamber 130 there is a target 140 and a substrate 150 opposite to the target 140. The target 140 includes a backing plate 144. The material of the backing plate 144 is copper. Before sputtering, a target material 142 specially needed is mounted to the backing plate 144. The substrate 150 includes a holder 154. One terminal of the high frequency power supply 110 connects with the backing plate 144 of the target 140 via a tunable matching network 120, which may be an inductor or a capacitor. The other terminal of the high frequency power supply 110 and the holder 154 of the substrate 150 are grounded. Before sputtering, a base material 152 to be sputtered is placed on the holder 154. In the preferred embodiment, the molding surface 12 of the mold 50 is functioned as the base material 152 to be sputtered.

The sputtering apparatus 100 also includes an air exhausting system 160 and an air feeding system 170 connecting with the hermetic chamber 130 separately. The air exhausting system 160 is used to create a vacuum in the cavity 130. The air feeding system 170 is used to feed a sputtering gas and reactive gases into the hermetic chamber 130.

The air feeding system 170 has a number of valves and corresponding mass flow rate controllers (MFC) which are used to respectively control each reactive gas so as to form $SiCH_xN_y$ having different composition. Generally, the sputtering gas fed into the hermetic chamber 130 via a valve 172 is inert gases, which can easily be ionized, at the same time, have stable chemical properties. Thus it is not easy to react with the target material 142 and the base material 152 in the hermetic chamber 130. In the preferred embodiment, an argon (Ar) gas is employed as the sputtering gas. One of the reactive gases fed into the hermetic chamber 130 via a valve 174 is hydrogen gas or hydrocarbon gas including hydrogen element, such as methane or ethane, or a combination thereof. The other is nitrogen gas, fed thereinto via a valve 176.

Furthermore, to lower the temperature of the target 140 during sputtering, and avoid overheating the target, it is preferred to set a cooling system 180 on a surface of the backing plate 144, opposite from the target material 142. Because of the presence of the cooling system 180, the molding temperature can maintain at a safe and stable level.

The sputtering process particularly provided in the embodiment includes the following steps:

First of all, the target material 142 is mounted to the backing plate 144, and the mold 50 is placed on the holder 154, with the molding surface 12 thereof facing the target material 142.

Secondly, the air exhausting system 160 is switched on to exhaust airs out of the hermetic chamber 130 to create a vacuum in the hermetic chamber, preferably to a vacuum of above $5 \times 10^7$ Torr, and then closing the air exhausting system 160.

Thirdly, the valve 172 of the air feeding system 170 is opened to introduce the sputtering gas, and the valves 174, 176 are opened to introduce the reactive gases into the hermetic chamber 130.

Fourthly, a high frequency voltage is applied to the target and the mold (the two functions as two electrodes) to form a high frequency electric field, to make the electric field 102 discharge at a frequency of 13.56 MHz. The inert gas is ionized, the target material 142 is bombarded by the ionized inert gas thereby silicon (Si) and carbon (C) atoms being dislodged therefrom. Those atoms then react with the reactive gas to form $SiCH_xN_y$. The formed $SiCH_xN_y$ is ultimately deposited onto the molding surface 12 of the mold 50 to form the thin film 30. By controlling flow rate, time and radio of the two reactive gases: the hydrogen gas or hydrocarbon gas including hydrogen element and nitrogen gas, $SiCH_xN_y$ films with different values of x and y will be obtained.

Finally, when a thickness of the thin film 30 is in the range from 100 to 1000 nanometers, the high frequency electric field is shut off.

It is well known that molding temperature from glass lenses requires to be 500~600 centigrade. Since $SiCH_xN_y$ and WC all have a high melting point, with the former of which being 2970K and the later being 2900K, both the molding portion 10 and the thin film 30 formed thereon can undergo molding temperature needed during molding optical lenses. Simultaneously, $SiCH_xN_y$ has similar coefficient of thermal expansion with WC, while has clearly different coefficient of thermal expansion with glass, thus it is a perfect film which can adhere to the molding portion and at the same time can separate from the lens product easily.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mold for forming optical lenses, comprising:
   a molding portion having a molding surface;
   wherein a thin film is formed on the molding surface, the thin film being comprised of SiCHxNy, wherein x is in a range of 0.02~0.1, y is in a range of 0.05~0.3.

2. The mold as claimed in claim 1, wherein the molding portion is comprised of WC.

3. The mold as claimed in claim 1, wherein a thickness of the thin film is in a range from 100 to 1000 nanometers.

4. The mold as claimed in claim 1, wherein the thin film is comprised of SiCHxNy, x is a range of 0.03~0.05, y is in a range of 0.08~0.15.

5. The mold as claimed in claim 3, wherein the thickness of the thin film is in a range from 200 to 500 nanometers.

6. The mold as claimed in claim 2, wherein a coefficient of thermal expansion of the thin film comprised of SiCHxNy approximates to that of the mold portion comprised of WC.

7. The mold as claimed in claim 1, wherein a roughness of the molding surface is less than 10 nanometers.

8. The mold as claimed in claim 1, wherein the thin film is formed on the molding surface of the molding portion by a radio frequency reactive sputtering process.

9. The mold as claimed in claim 8, wherein the radio frequency reactive sputtering process comprising the steps of:

connecting a SiC target and a mold perform having a molding surface to two respective electrodes;

placing the SiC target and the mold perform in a hermetic chamber with the molding surface facing the SiC target;

evacuating the hermetic chamber to create a vacuum in the hermetic chamber;

introducing a sputtering gas and reactive gases into the hermetic chamber, the reactive gases being a combination of a hydrogen gas or hydrocarbon gas, and a nitrogen gas; and applying a high frequency voltage between the electrodes at a frequency of about 13.56 MHz, thereby obtaining the mold having a SiCHxNy thin film formed on the molding surface, wherein x is in the range of 0.02 ~0.1, y is in the range of 0.05~0.3.

* * * * *